United States Patent [19]
Warren et al.

[11] Patent Number: 5,947,419
[45] Date of Patent: Sep. 7, 1999

[54] AERIAL CARGO CONTAINER

[76] Inventors: Charles M. Warren, 102 B Sherwood Rd., Perry, Ga. 31069; Charles V. Warren, 3600 Abernathy Dr., Fayetteville, N.C. 28301

[21] Appl. No.: 09/009,955

[22] Filed: Jan. 21, 1998

[51] Int. Cl.$^6$ .............................. B69D 1/08; F42B 10/60
[52] U.S. Cl. ................................... 244/138 A; 244/1 TD; 244/137.4; 102/384; 102/388
[58] Field of Search ............................. 244/1 TD, 137.4, 244/138 A, 139; 102/384, 388

[56] References Cited

U.S. PATENT DOCUMENTS

| | | |
|---|---|---|
| 2,324,146 | 7/1943 | Frazer . |
| 2,450,992 | 10/1948 | Sanderson . |
| 2,495,486 | 1/1950 | Stevenson . |
| 2,776,017 | 1/1957 | Alexander . |
| 2,917,255 | 12/1959 | Boyd . |
| 2,969,211 | 1/1961 | Saurma . |
| 3,115,831 | 12/1963 | Suter . |
| 3,168,267 | 2/1965 | Ferris . |
| 3,194,519 | 7/1965 | Rhodes . |
| 3,265,136 | 8/1966 | Wojciechowski et al. . |
| 3,273,834 | 9/1966 | Bower . |
| 3,342,439 | 9/1967 | Behrendt . |
| 3,401,906 | 9/1968 | Girard . |
| 4,890,554 | 1/1990 | Schleimann-Jensen ................. 102/384 |

*Primary Examiner*—Virna Lissi Mojica
*Attorney, Agent, or Firm*—Rhodes, Coats and Bennett, L.L.P.

[57] ABSTRACT

An aerial cargo container system for transporting cargo from an aircraft to the ground having a cargo box with a continuous side wall with six rectangular side panels, and rotor blades having stowed positions against alternating box side panels and deployed positions extending outwardly from the box in a generally horizontal plane. Each blade may include a lower panel and an upper panel that has two triangular sections behind the leading edge that forms an aerodynamic camber. The blades are hinged to a rotor hub secured across the top of the box. The upward deployment of the blades is limited by tethers extending from the blades down to a tether attach frame secured across the bottom of the box. The box and blades are preferably formed of corrugated paper or plastic material. The entire unit rotates with the load to create aerodynamic braking and lower cargo to the ground with a minimum of energy being translated to the cargo on impact.

15 Claims, 3 Drawing Sheets

AERIAL CARGO CONTAINER

BACKGROUND OF THE INVENTION (1) Field of the Invention

The present invention relates generally to an apparatus for transporting cargo from an aircraft to the ground, and in particular to an improved, disposable cargo container comprised of a box with extendible rotor blades that can be dropped from an aircraft to the ground under adverse conditions without damage to the cargo.

(2) Description of the Prior Art

Numerous circumstances require the transport of various kinds of cargo to inaccessible or remote areas where ground transportation is not possible or timely. These circumstances include both military and peacetime conditions, such as providing emergency food, fuel and medical supplies to victims of natural disasters, fighting of forest fires, etc.

In many instances, the cargo can be transported to the area by helicopter, or dropped from an airplane with a parachute. However, helicopters are not always readily available, and are expensive to operate. Parachutes are also expensive, particularly when used to drop relatively small quantities of cargo, and are usually not recoverable due to the terrain and the conditions under which the cargo is dropped.

Various prior art patents, since at least as early as the 1940s, have proposed an alternative means involving the dropping of containers of small cargo loads from an aircraft without a parachute. Instead, the container is constructed of a disposable box with attached wings or rotor blades that extend outwardly when the box is dropped from an aircraft. The force of the air against the lower surface of these blades causes the blades to turn in the direction of their leading edges, rotating the attached box and creating lift to slow the container's descent.

The following patents are representative of these prior art devices:

| Patent Number | Inventor |
| --- | --- |
| 2,450,992 | Sanderson |
| 3,168,267 | Ferris |
| 2,324,146 | Frazer |
| 2,495,486 | Stevenson |
| 3,115,831 | Suter |

This alternative transport means, while conceptually addressing the need for inexpensive cargo delivery, has apparently found no significant application. This lack of use is believed to be attributable to two somewhat related reasons; cost effectiveness and durability. In order for this type of devise to find a niche in cargo transport, the cost must be low since the container is not recovered. However, prior art designs that could be produced at an acceptable cost do not have the durability to withstand the destructive forces to which they are subjected, resulting in failure of the systems to get their load to the intended destination undamaged. However, the need remains and the basic concept is appealing. Therefore, a disposable aerial cargo container that could be manufactured at an acceptable cost while still having the required strength and durability should be of considerable utility.

SUMMARY OF THE INVENTION

The following summary describes an improved aerial cargo container useful in transporting cargo from an aircraft to the ground. This cargo container incorporates features not suggested by the prior art that enable production of the container at an acceptable cost, while still providing the strength and durability necessary for transportation of cargo loads of sixty (60) pounds or more under adverse conditions without significant damage to the cargo upon impact with the ground.

Essentially, the performance of the cargo container of the present invention is attributable to various modifications and refinements of cargo containers of the type described in the above prior art. That is, the present container, like prior art containers, is comprised of a box for holding the cargo to be transported, and a plurality of wings or rotor blades having hinged roots, with the blades being deployable to a substantially horizontal attitude when the container is dropped from the aircraft. As with prior art containers, air pressure against the rotor blades causes the box to rotate and create aerodynamic lift to slow the descent of the container.

The cargo container of the present invention, however, incorporates various features not suggested by the prior art. These improvements reside in the following three areas: 1) the box or cargo holder construction and blade positioning, 2) attachment of the rotor blades, and 3) the rotor blade construction. Each improvement contributes to the economical construction of the container and to its superior performance. Depending upon the particular container and its uses, these features may be used alone or in combination.

The configuration of the cargo box and the placement of the rotor blades thereon can dramatically affect various aspects of the container including its carrying capacity, its durability, and its cost of manufacture. It has been determined that the preferred cargo box addressing these concerns is a box with a hexagonal cross-section comprised of a continuous side wall formed of six rectangular attached facets that are positioned in a hexagonal configuration, and a hexagonal end wall closing one end of the box formed by the side wall material. The open end of the container is closed with a hexagonal shaped plug type lid to enclose the cavity.

The box walls, for purposes of disposability and economy, are preferably formed of corrugated paper or hardboard. The continuous sidewall may be formed of a single sheet with spaced creases to form the individual panels. The abutting ends of the sheet are joined, e.g., by taping, staples or glue. Alternatively, the sidewalls can be formed of six rectangular panels that are joined to each other at their abutting side edges. The size of the box will depend upon the type of cargo to be transported and the cargo size and weight. Generally, however a box with a length from about 32 to about 36 inches and a diameter from about 15 to about 18 inches will be suitable for most cargo up to a weight of about 60 pounds. Thus, each side panel will have a length of from about 32 to about 36 inches and a width of from about 15 to about 18 inches.

The container includes three rotor blades, with each blade being positioned adjacent to alternating side panels. Thus, a container formed of six side panels will have three rotor blades, with one blade adjacent to every other panel. When the container is stowed, the rotor blades are folded against the side panels and, when deployed, extend outward from the box in a substantially horizontal plane substantially perpendicular to the side panels. In order to achieve maximum lift, while still being easy to store, the blades preferably have length and width dimensions approximating the corresponding dimensions of the side panels.

In prior art disposable cargo containers, rotor blades have been hinged at their root to one panel or side of the container box. Since disposable boxes, of economic necessity, are usually made of corrugated paper, or another disposable material with low tear strength, forces against the rotor blade caused by air pressure and the centrifugal force tends to rip the hinge, and often part of the box. Separation of one or more rotors during flight can be disastrous to the load since the container will probably plummet to the ground, damaging the cargo.

In the present invention, this deficiency has been addressed by the use of a separate rotor blade hub positioned at the closed (upper) end of the box, with the rotor blades being hinged at their roots to the hub, instead of directly to the box. Preferably, the hub is in the shape of a metal wire frame that extends over the top and upper edges of the box. The rotor hinge points on the hub are located on the support adjacent alternating box panels, with hinge pins being used to attach the rotor blades to the hinge points of the hub. Thus, the centrifugal force exerted by the blades act upon each other through the hub and not the box. Preferably, the hub includes a common central point with connections from the central point to each of the hinge points. With this arrangement, the rotor blade's centrifugal forces tend to act against each other to negate the stresses and loads on the box.

Upward movement of the blades during deployment and flight is limited by tethers and shock cords having their upper ends attached to the blades and their lower ends attached at the lid (lower) end of the box. The tethers may be resilient, such as a bungee cord, or a non-resilient cord of a material such as nylon.

The lower ends of the tethers can be attached directly to the box. However, since the tethers are also subjected to high forces, particularly during deployment, the box preferably includes a tether attachment frame that extends across the bottom wall (lid). This tether attachment frame includes attachment points to secure the lower end of each tether approximately beneath the rotor blade to which the upper end of the tether is attached. For example, the attachment frame can be in the shape of an equilateral triangle having apexes that extend beyond the periphery of the box under the alternating panel over which the panels are positioned, with one tether being attached at each apex of the triangle.

Prior art rotor blades for expensive devices have been made of metal or wood. However, rotor blades for containers designed for the purpose of the present invention, have been made from a planar piece of corrugated paper or polymer to reduce cost. These latter blades are not of sufficient strength to withstand the forces to which the container is subjected or to create significant aerodynamic braking due to lift. The present invention solves this problem with a rotor blade that is made from a single corrugated material sheet or a plurality of segments joined in a particular manner to provide the needed structural integrity under incurred aerodynamic and centrifugal loading, while maintaining the required economy.

Basically, the improved rotor blade is comprised of a lower facet, and a multi-facet upper panel secured to the lower panel to form an integral blade. The lower panel is essentially planar and of a single facet, with leading and trailing edges, which may have constant or varying chord distance between them along the span of the blade. Together, the panels form a blade having a planar bottom surface, and a top surface that includes an upwardly extending forward triangle adjacent to the leading edge of the blade and a planar surface extending downwardly and rearwardly from the forward triangular section aft to a point forward of the trailing edge, forming and aft triangular section. A pocket for a structural spar exists between these two triangular sections.

To form the forward triangular section, the front segment is inclined upward and back from the leading edge of the blade. A generally vertical forward spar pocket segment has an upper edge common to the rear edge of the upper forward segment of the forward triangular section, and a lower edge abutting the lower panel.

The center segment spar pocket common to the upper panel has a front edge adjacent and parallel to, but not necessarily abutting, the rear edge of the front segment, and is inclined to the rear and down to a rear edge that also abuts the lower panel. A generally vertical spar has an upper edge integral with the front edge of the center segment, and a lower edge abutting the lower panel.

The rear segment of the upper panel is generally planar and abuts the upper surface of the lower panel, and has a front edge integral with the rear edge of the spar pocket and a rear edge integral with the rear edge of the lower panel.

The lower and upper facets of the rotor blade can be made from a single corrugated material that is folded along the longitudinal axis of the blade to form the panel segments. That is, the blade can be formed by longitudinally folding the outer sides of a paper sheet over a planar central section that forms the lower panel. One side of the sheet is creased to form the front segment and forward spar pocket segment, while the other side of the sheet is folded to form the rear and central segments of the upper panels, and the aft spar pocket segment.

A folded piece of corrugated material is inserted in the spar pocket and forms the spar. The top of the spar is even with the top of both the forward and aft triangular segments. The spar translates the aerodynamic forces to the tether and the box. The front and central segments of the upper panel, supported by the spar and the spar pocket, form a raised triangular section along the top of the blade parallel to the blade's longitudinal axis and adjacent the blade's leading edge. This triangular section forms the structural rigidity of the rotor, as well as providing the aerodynamic camber required to generate lift.

The tether is attached to the spar in such a way to translate all of the aerodynamic lift and planar drag to the box from the rotor blade. The upper end of the tether can extend through the blade's lower facet and around the spar and spar pocket, and then back through the lower facet to form a loop.

The box is designed to be loaded upside down. That is, the lid end of the box that will be in a down position when the box is in flight will be oriented upward during loading. For this discussion, box orientation convention will be rotor hub end down and lid end up. Thus, when assembled and oriented for loading, the box has a continuous sidewall formed of six adjacent, rectangular side panels, and a lower hexagonal end wall secured across the rotor hub end of the box. The box is inserted into the rotor hub, which forms a base or skid upon which the container rests. The rotor blades are attached at their root hinge points, to the support, and are folded up against the sidewalls of the box. A breakaway strap or other means of sacrament is used to hold the blades in their folded position during loading and transport to the drop zone.

When loading, a spacer may first be inserted into the container. This spacer serves two purposes. First, the spacer prevents cargo from being loaded into what will become the upper end of the container after deployment, thereby ensuring that the center of gravity of the box will be near the centroid of the cavity to ensure positive blade deployment.

Also, the spacer, which can be of an expanded material, such as honeycomb paper, can absorb some of the shock of loading and carriage in the aircraft.

After the payload is centered and chocked with disposable packing along the vertical axis of the box, the hexagonal plug lid is secured in the open end. This lid is constructed of honeycomb or expanded material which will tend to crush upon landing, absorbing shock and dissipating the deceleration forces. The tether attach frame is placed over the lid and strapped into place with a packing strap that runs around the rotor hub and the entire box. The strap will hold the lid, the tether attach frame, and the rotor hub in place on the box until the aerodynamic and deceleration loads can hold the assembly together in flight. Once the box has landed, the strap is removed to unpack the payload.

The loaded container is then placed in the same orientation in which it was loaded in an aircraft and flown to the drop area. The box is pushed from the aircraft over the drop zone with a static line or other mean removing the blade-restraining strap that allows the blades to deploy. The relative wind around the box causes a lifting force to deploy the rotor blades which rotate about their hinge attach points and are snubbed by the tethers and the shock cords. The blades will be limited to a substantially horizontal orientation, i.e. plus or minus ten (10) degrees of horizontal by the tethers. In turn, the tether attach frame absorbs the tension in the tethers instead of the box.

The force of the air against the lower facet of the blades, with the leading edges of the blades being lower than their trailing edges, causes the container to rotate in the direction of the leading edges, and accelerate rotationally until it achieves rotational terminal velocity, generating maximum aerodynamic lift, thereby slowing the box to its terminal vertical velocity. Centrifugal forces acting on the blades that heretofore could cause the blades to rip from the box during deployment and rotation are absorbed by the rotor hub.

The triangular facets of the rotor blades creates an aerodynamic camber and form structural box beams to insure rotor blades stiffness until centrifugal force stiffening can assist the structure during maximum deceleration. This slower rate of descent minimizes damage to cargo upon impact of the container with the ground. The crushable shock-absorbing lid further lessens the risk of damage to the payload.

Accordingly, one aspect of the present invention is to provide an aerial cargo container comprising a box having a continuous side wall formed of six rectangular side panels, an upper end wall at one end of the side wall and a lower end wall at the opposite end of the side wall, the walls forming a cargo cavity; and three rotor blades having hinged roots, the blades having a stowed position against alternating side panels and a deployed position extended outwardly in a generally horizontal plane.

Another aspect of the present invention is to provide an aerial cargo container comprising a cargo box having a continuous side wall, a first end cap and a second end cap; a rotor hub across the first end cap; and a plurality of rotor blades having leading and trailing edges, and root hinged to the rotor hub, the blades having a stowed position against the box and a deployed position extending outwardly from the box in a generally horizontal plane.

Still another aspect of the present invention is to provide an aerial cargo container comprised of a cargo box with a plurality of rotor blades with leading and trailing edges, each of the blades having a stowed position against the box and a deployed position extending outwardly from the box in a generally horizontal plane, the blades being formed of corrugated material and having a planar lower surface and an upper surface that includes triangular raised sections adjacent the leading and trailing edges.

Another aspect of the invention is to provide an aerial cargo container comprising of a box having a continuous side wall formed of six rectangular side panels, an upper end wall at one end of the side wall and a lower end wall at the opposite end of the side wall, the walls being constructed of corrugated material and forming a cargo cavity; three rotor blades having leading and trailing edges, and inner root ends, the blades having a stowed position against alternating side panels of the side wall and a deployed position extending outwardly from the box in a generally horizontal plane, each of the blades consists of a lower panel and an upper panel, made up of two triangular boxes, a spar pocket and a spar. The front triangular box is adjacent to the leading edge of the blade, the rear triangular box is adjacent to the trailing edge, abutting the lower panel, and the central section between the two triangular boxes consisting of the spar pocket and the spar contained therein; a rotor hub across the first end wall, the root ends of the blades being hinged to the hub; a tether attach frame across the second end wall; and blade tethers attached to the blade spars to the tether attach frame.

These and other aspects of the present invention will become apparent to those skilled in the art after a reading of the following description of the preferred embodiment.

DETAILED DESCRIPTION OF THE INVENTION

Figure 1:
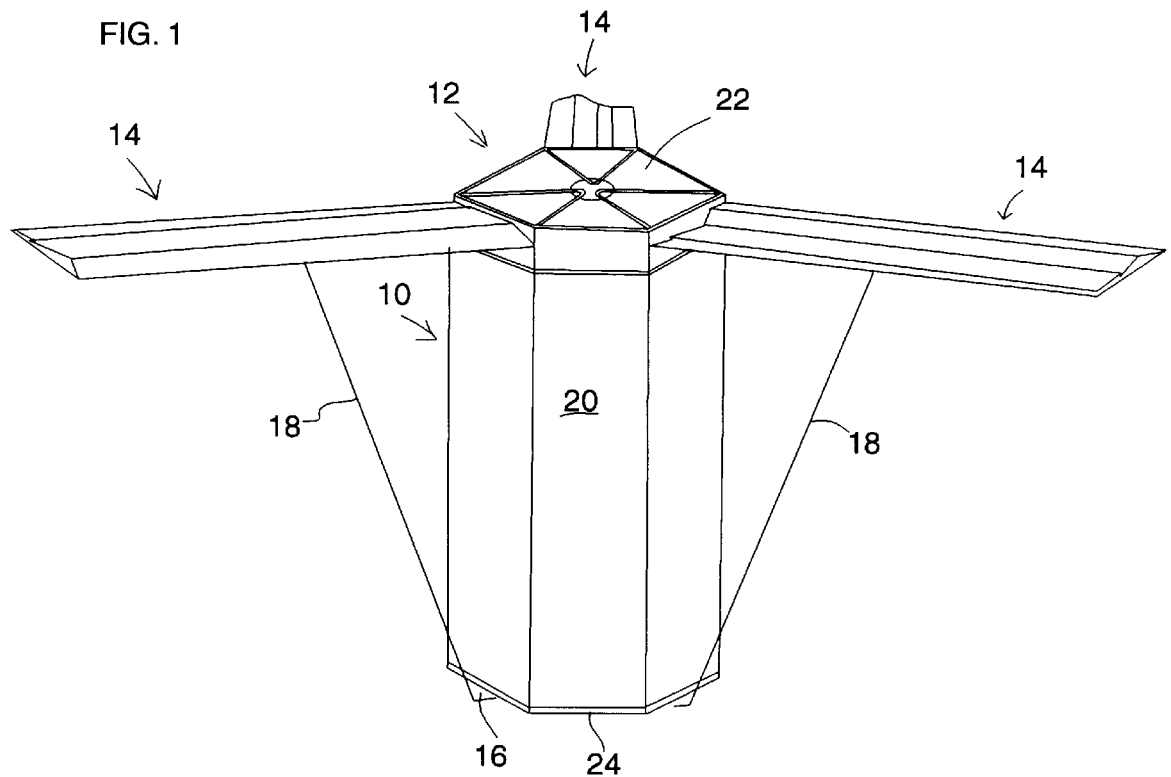
FIG. 1 is a perspective view of the upright and deployed cargo container as if it were in flight.

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

As best shown in the drawings, a preferred embodiment of the container includes a box, generally 10, a rotor hub 12, three rotor blades 14, a tether frame 16, and strut tethers 18.

Box 10 is formed of six rectangular side panels joined at their abutting edges to from a continuous sidewall 20. An upper hexagonal end wall 22 closes the upper end of wall 20 and a lower hexagonal honeycomb plug lid 24 closes the opposite end of wall 20. A load spacer 28 is inserted into the interior of box 10 adjacent wall 22 during loading of box 10 to position the payload closer to the centroid of the box Rotor hub 12 is formed of a lightweight welded wire or extruded plastic cage extending across end cap 22 and around the upper ends of wall 20. Hub 12 is strengthened by the use of a central plate 30 and three triangular sections 32 with their apexes welded or formed to plate 30 and their bases adjacent the upper ends of alternating side panels of wall 20.

Blades 14 are hinged at their roots to hub 12 with hinge pins 34, which extend through hinge points 36 extending from hub 12 on alternating sides. In order for the box to rotate and create aerodynamic lift, the chord line of each rotor blade is set at a negative angle of incidence from a horizontal line that is parallel to the end cap 22. This angle creates rotative forces that spin the entire assembly. The angle of incidence is between minus four (−4) and minus six (−6) degrees. At the lower end of the container, a tether frame 16 extends across plug lid 24. Tethers 18 extend from the tether frame 16 to approximately the mid-span of each rotor blade 14.

Figure 2:
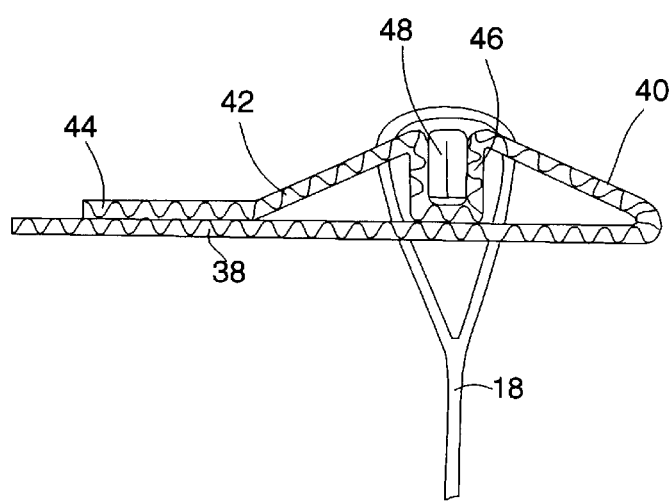
FIG. 2 is sectional side view of one of the rotor blades showing the tether attachment.
Figure 3:
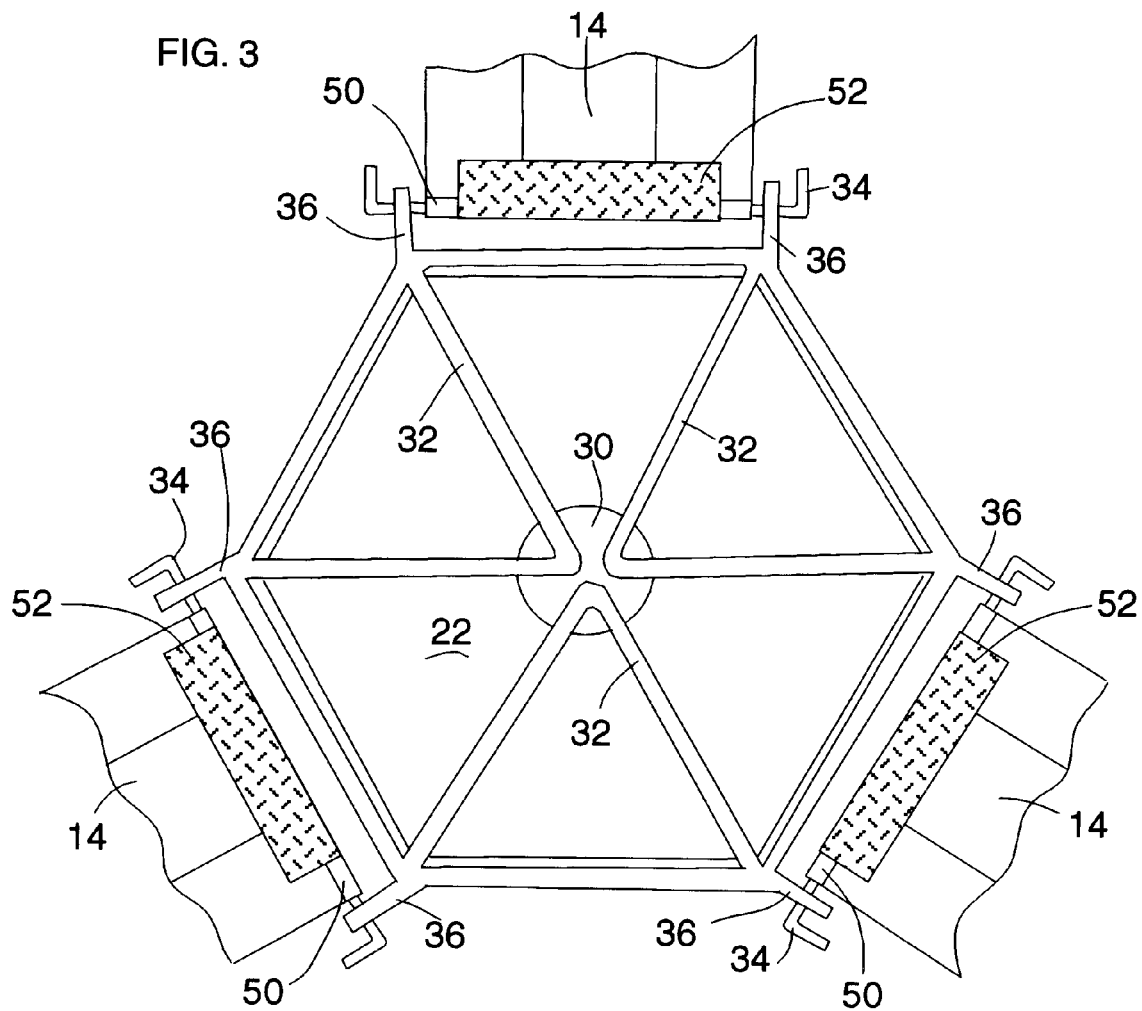
FIG. 3 is a top view of the container showing the rotor blade root hinges.
Figure 4:
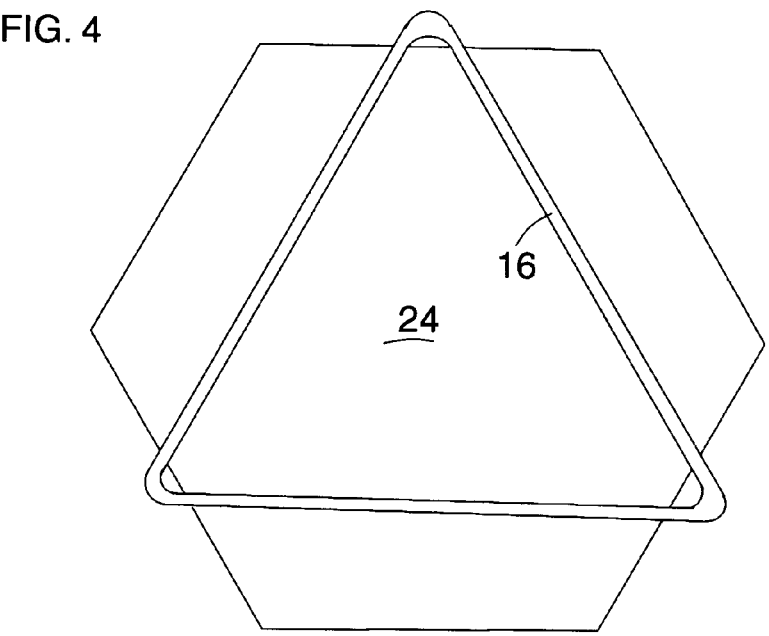
FIG. 4 is a bottom view of the container showing the tether attach frame and plug lid.

As shown in FIG. 2, each rotor blade 14 consists of a folded corrugated material that forms a lower panel 38, an upper panel comprised of a front segment 40, a spar pocket 46, a trailing segment 42, a rear segment 44, and a spar 48 inserted and bonded into the spar pocket formed by 46. Each blade of the preferred embodiment is formed of a single corrugated piece, with the corrugations being parallel to the span of the blade. A hinge tube 50 is attached to the root of each blade by a root re-enforcement plate or strap 52. Plate 52 stiffens the blade root and helps to translate the centrifugal and twisting forces to hub 12.

Figure 5:
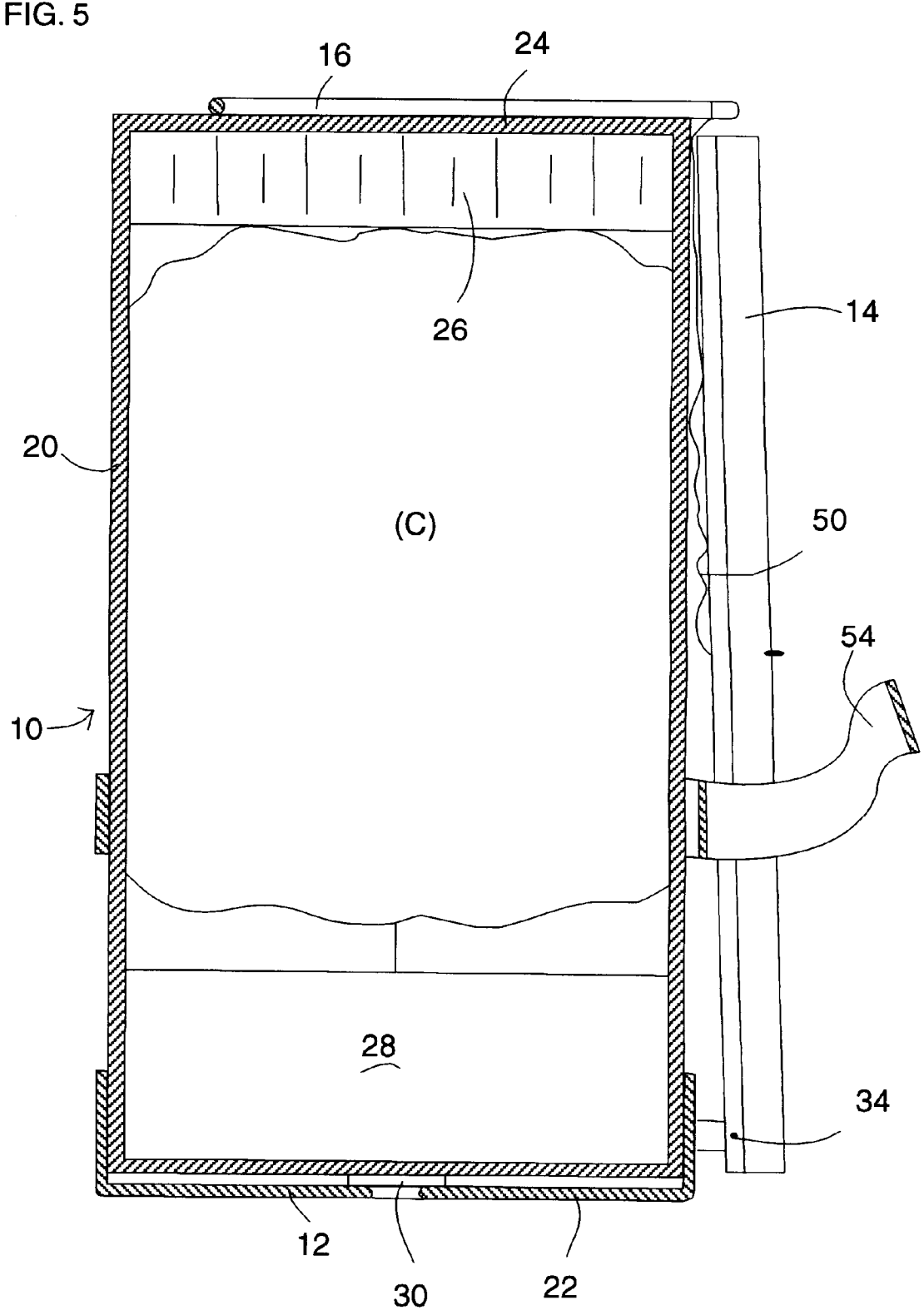
FIG. 5 is a sectional side view of the container in the loaded and stowed position.

The container is positioned as shown in FIG. 5 when being loaded and transported. Spacer 28 is inserted into the container cavity, followed by the cargo (C). After loading, the plug lid 24 and tether attachment plate 16 are secured in place with a strap assembly 54 by securing the hub 12 and frame 16 to the box 10. Tethers 18 from each rotor 14 are attached to attach frame 16. The rotors 14 are secured with rotor containment strap 54. The box is loaded in the aircraft and the blade containment system is attached to the blade deployment static line in the aircraft. The box is pushed out of the aircraft and blade containment strap 54 is released, causing all three blades 14 to be deployed into the relative wind. The box starts to rotate, generating aerodynamic braking forces by generating lift. This aerodynamic lift is translated through the struts to the tether attach frame 16 which then directs the force through the plug lid 24 to the cargo (C). This force will stabilize when the box and load decelerate to the terminal velocity. This is the minimum velocity the box achieves before landing.

Certain modifications and improvements will occur to those skilled in the art upon a reading of the foregoing description. It should be understood that all such modifications and improvements have been deleted herein for the sake of conciseness and readability but are properly within the scope of the follow claims.

What is claimed is:

1. An aerial cargo container comprising:
    a) a cargo box having an upper end;
    b) a rotor hub affixed across the upper end of said box, said hub includes a plurality of rotor blade hinge point pairs, each pair having a leading hinge point and a trailing hinge point, said leading hinge point being lower than said trailing hinge point; and
    c) a plurality of rotor blades having aerodynamic camber, leading and trailing edges, and roots hinged to said rotor blade hinge point pairs, said blades having a stowed position against said box and a deployed position extending outwardly from said box in a generally horizontal plane, said blades being rotatable with said hub and said box.

2. The aerial cargo container delivery system of claim 1, further including tethers to limit the upward movement of said blades upon deployment.

3. The aerial cargo container delivery system of claim 1, further including a deformable plug lid adjacent said lower wall.

4. The aerial cargo container delivery system of claim 1, wherein each of said blades is formed of a corrugated material with a planar lower surface and a cambered upper surface that includes a triangular raised section.

5. The aerial cargo container delivery system of claim 1, further including a tether attach frame across said lower plug lid end wall.

6. The aerial cargo container delivery system of claim 1, wherein said box is constructed of corrugated material.

7. The aerial cargo container system of claim 1, wherein said hub is formed of welded wire or molded plastic.

8. The aerial cargo container delivery system of claim 1, wherein said box has six side panels, and said system has three blades, said blades having stowed positions against alternating side panels.

9. The aerial cargo container delivery system of claim 1, wherein said box includes a lower wall, a tether attach frame across said lower wall, and tethers extending from said blades to said tether attach frame.

10. The aerial cargo container system of claim 1, further including hinge pins extending through said pairs of hinge points and the rotor blade root hinge to attach said blades to said hub.

11. The container of claim 1, wherein each of said blades includes a lower panel and an upper panel, said upper panel including a front segment inclined upward and back from the front edge of the blade, a spar pocket that contains a blade spar, a central segment having a front edge adjacent the rear of the spar pocket, and inclined to the rear and down to a rear edge abutting the lower panel, and a rear segment parallel to the lower panel and having a front edge integral with the rear edge of the center segment and a rear edge integral with the rear edge of the lower panel.

12. The container of claim 1, wherein the upper surface of each of said blades further includes a planar surface behind said trailing triangular section, said planar section being parallel to said lower surface.

13. The container of claim 1, wherein each of said blades if formed from a single sheet.

14. An aerial cargo container comprising:
    a) a box having a continuous side wall formed of six rectangular side panels, an upper end wall at one end of said side wall and a lower plug lid end wall at the opposite end of said side wall, said walls being constructed of corrugated material and forming a cargo cavity;
    b) three rotor blades having leading and trailing edges, and hinged roots, said blades having a stowed position against alternating side panels of said side walls and a deployed position extending outwardly from said box in a generally horizontal plane, each of said blades including a lower panel and an upper panel, said upper panel including a triangular section;
    c) a rotor hub affixed across the upper end wall, said hub including rotor blade hinge point pairs adjacent alternating panels, each pair having a leading hinge point and a trailing hinge point, said leading hinge point being lower than said trailing hinge point said blades being hinged at their roots to said blade hinge point pairs, said blades being rotatable with said hub and said box;
    d) a tether attach frame across the lower plug lid wall; and
    e) tethers extending from said blades to said tether attach frame.

15. The container of claim 4, wherein the corrugations of said sheet is parallel to the longitudinal axis of said blade.

* * * * *